US012725937B2

(12) United States Patent
Kubwimana et al.

(10) Patent No.: US 12,725,937 B2
(45) Date of Patent: Sep. 1, 2026

(54) ADDITIVELY MANUFACTURED MODULAR APERTURE ANTENNA WITH SHARED SHORTING POST

(71) Applicant: BAE SYSTEMS Information and Electronic Systems Integration Inc., Nashua, NH (US)

(72) Inventors: Jean L. Kubwimana, Merrimack, NH (US); Jacob Tamasy, Nashua, NH (US); Alexander D. Johnson, Waltham, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 255 days.

(21) Appl. No.: 18/170,867

(22) Filed: Feb. 17, 2023

(65) Prior Publication Data

US 2024/0283124 A1 Aug. 22, 2024

(51) Int. Cl.
*H01Q 21/24* (2006.01)
*H01Q 5/25* (2015.01)
(Continued)

(52) U.S. Cl.
CPC ............... *H01Q 21/24* (2013.01); *H01Q 5/25* (2015.01); *H01Q 9/28* (2013.01); *H01Q 21/062* (2013.01)

(58) Field of Classification Search
CPC .... H01Q 21/062; H01Q 1/38; H01Q 21/0025; H01Q 21/24; H01Q 21/0006; H01Q 21/22; H01Q 1/48; H01Q 1/50; H01Q 1/288; H01Q 9/285; H01Q 21/061; H01Q 1/241; H01Q 5/25; H01Q 21/26; H01Q 1/36;
(Continued)

(56) References Cited

U.S. PATENT DOCUMENTS

| | | | |
|---|---|---|---|
| 10,320,088 B1 | 6/2019 | Johnson et al. | |
| 10,333,230 B2 | 6/2019 | Elsallal et al. | ***H01Q 9/28*** |

(56) References Cited (2006.01)

(56) References Cited *H01Q 21/06*

(56) References Cited (2006.01)

(Continued)

OTHER PUBLICATIONS

The MITRE Corporation. "ASI to Launch Cubesat Demo That Could Lead to Quicker Access to Satellite Data", (May 28, 2019), 3 pages.

(Continued)

*Primary Examiner* — Dimary S Lopez Cruz
*Assistant Examiner* — Anna N Hamadyk
(74) *Attorney, Agent, or Firm* — Gary McFaline

(57) ABSTRACT

An antenna assembly includes an antenna feed, a ground plane, a first antenna element, a second antenna element, and a shorting post that is shared between the first and second antenna elements. The first antenna element includes a first conductive dipole arm in planar alignment with a surface of the ground plane and a second conductive dipole arm in planar alignment with the surface of the ground plane and adjacent to the first conductive dipole arm. The second antenna element includes a third conductive dipole arm in planar alignment with the surface of the ground plane and adjacent to the second conductive dipole arm, and a fourth conductive dipole arm in planar alignment with the surface of the ground plane and adjacent to the third conductive dipole arm. The shorting post is in electrical communication with the ground plane, the second conductive dipole arm and the third conductive dipole arm.

20 Claims, 10 Drawing Sheets

(58) Field of Classification Search
CPC ........ H01Q 21/0087; H01Q 9/16; H01Q 5/48; H01Q 9/28
See application file for complete search history.

(56) References Cited

U.S. PATENT DOCUMENTS

| | | | | |
|---|---|---|---|---|
| 10,840,593 | B1 | 11/2020 | Johnson et al. | |
| 2017/0025767 | A1 | 1/2017 | Elsallal et al. | |
| 2020/0076090 | A1* | 3/2020 | Franzini | H01Q 3/26 |
| 2020/0321708 | A1* | 10/2020 | Shi | H01Q 23/00 |
| 2021/0203085 | A1* | 7/2021 | Jordan | H01Q 5/48 |

OTHER PUBLICATIONS

Carvalho, et al, "Semi-Resistive Approach for Tightly Coupled Dipole Array Bandwidth Enhancement", IEEE Open Journal of Antennas and Propagation, Dec. 25, 2020, 8 pages.
Johnson, et al, "Phased Array with Low Angle Scanning and 46:1 Bandwidth", IEEE Transactions on Antennas and Propagation, IEEE Xplore, retrieved Jun. 17, 2020, 9 pages.
Targonski, et al, "Design of Wide-Band Aperture-Stacked Patch Microstrip Antennas", IEEE Transactions on Antennas and Propagation, vol. 46, No. 9, Sep. 1998, 7 pages.
Logan, et al, "A New Class of Planar Ultrawideband Modular Antenna Arrays With Improved Bandwidth", IEEE Transactions on Antennas and Propagation, vol. 66, No. 2, Feb. 2018, 10 pages.
Holland, et al, "A 7-21 GHZ Dual-Polarized Planar Ultrawideband Modular Antenna (PUMA) Array", IEEE Transactions on Antennas and Propagation, vol. 60, No. 10, Oct. 2012, 12 Pages.
Sekelsky, et al, "Ultra-wideband Dual-Polarized Scanning Metamaterial / Meta-ferrite Arrays*", IEEE Xplore, retrieved Jun. 17, 2020, 4 pages.
Doane, et al, "A Wideband, Wide Scanning Tightly Coupled Dipole Array With Integrated Balun (TCDA-IB)", IEEE Transactions on Antennas and Propagation, vol. 61, No. 9, Sep. 2013, 11 pages.

* cited by examiner

ADDITIVELY MANUFACTURED MODULAR APERTURE ANTENNA WITH SHARED SHORTING POST

FIELD OF DISCLOSURE

The present disclosure relates to antennas, and more particularly, to additively manufactured modular aperture antennas and antenna arrays.

BACKGROUND

An aperture antenna is a type of antenna that emits electromagnetic (EM) waves through an aperture. The aperture is typically considered to include a portion of a surface of the antenna through which a majority of the EM waves are transmitted or received. Aperture antennas can be arranged in arrays to provide wideband and ultra-wideband (UWB) operations, such as in conjunction with radar and tracking systems, high data rate communication links, and multi-waveform, multi-function front end systems.

Figure 1:
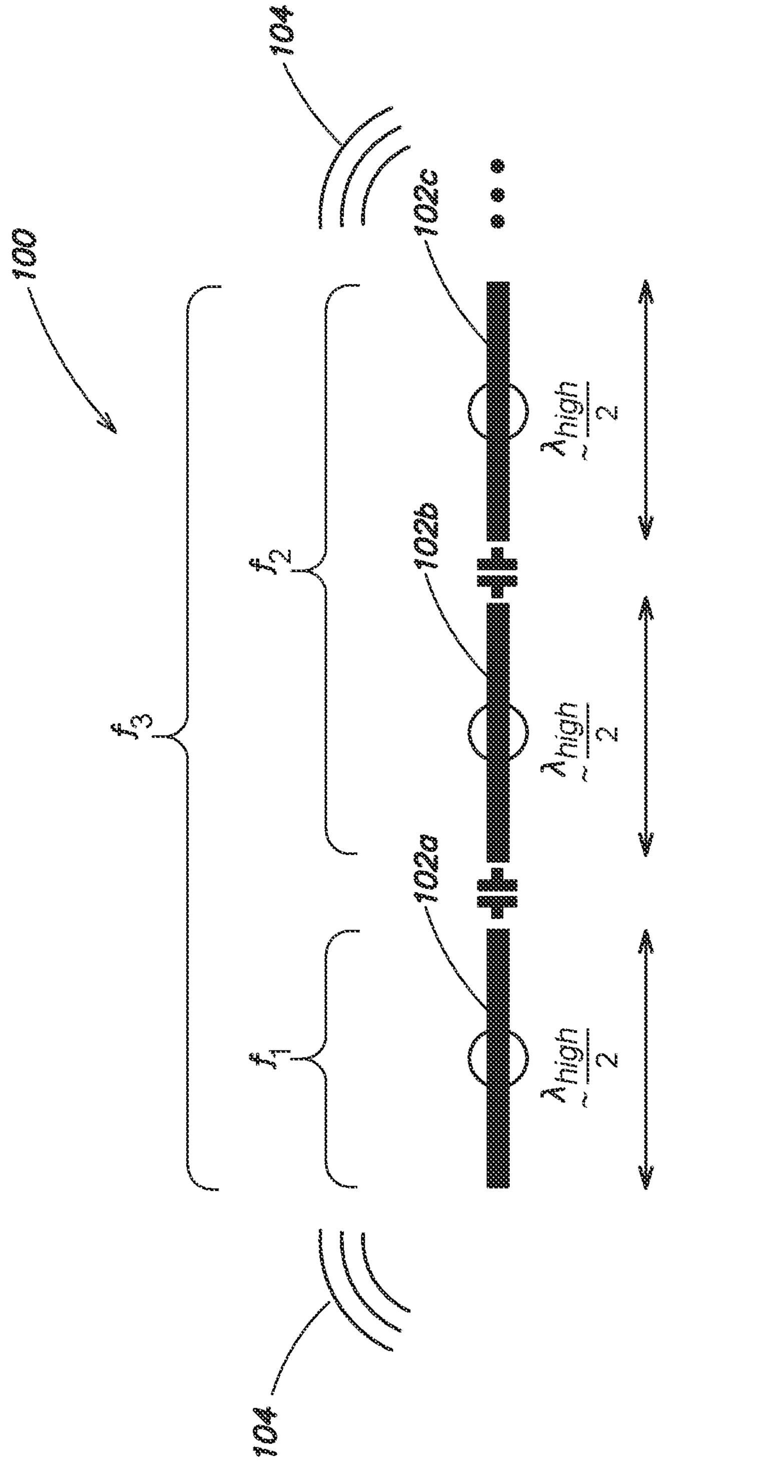
FIG. 1 is a schematic diagram of a tightly coupled dipole array ("TCDA"), in accordance with an embodiment of the present disclosure.

Although the following detailed description will proceed with reference being made to illustrative examples, many alternatives, modifications, and variations thereof will be apparent in light of this disclosure.

DETAILED DESCRIPTION

In accordance with an example of the present disclosure, an antenna assembly includes an antenna feed configured to receive a signal over a wide bandwidth, a ground plane, a first antenna element, and a second antenna element. The first antenna element includes a first conductive dipole arm in planar alignment with a surface of the ground plane and a second conductive dipole arm in planar alignment with the surface of the ground plane and adjacent to the first conductive dipole arm. The second antenna element includes a third conductive dipole arm in planar alignment with the surface of the ground plane and adjacent to the second conductive dipole arm, and a fourth conductive dipole arm in planar alignment with the surface of the ground plane and adjacent to the third conductive dipole arm. The antenna assembly further includes a shorting post in electrical communication with the ground plane, the second conductive dipole arm of the first antenna element and the third conductive dipole arm of the second antenna element.

In some examples, the antenna assembly further includes a first feedline in electrical communication with the first conductive dipole arm of the first antenna element and the antenna feed, and a second feedline in electrical communication with the fourth conductive dipole arm of the second antenna element and the antenna feed. In some examples, the antenna assembly further includes a third feedline in electrical communication with the second conductive dipole arm of the first antenna element and the antenna feed (balanced feed) or the ground plane (unbalanced feed), and a fourth feedline in electrical communication with the third conductive dipole arm of the second antenna element and the antenna feed (balanced feed) or the ground plane (unbalanced feed).

In some examples, the assembly includes an integral element additively manufactured into a single continuous piece of material. For example, the integral element includes the ground plane, the first conductive dipole arm, the second conductive dipole arm, the first feedline, the second feedline, and the shorting post. The integral element includes an electrically conductive material or a non-conductive material plated with an electrically conductive material. In some examples, the assembly further includes a non-conductive structural support, such as a dielectric foam or resin, surrounding integral element. The non-conductive structural support provides mechanical stability for the integral element and can also include sacrificial features that can be removed during fabrication of the assembly. For example, the assembly can be manufactured using any suitable additive or subtractive manufacturing process, including, but not limited to, 3-D printing, casting, computer numerical control (CNC), or the like. In some examples, the assembly can be manufactured as a single continuous unit or structure. In some other examples, individual components of the assembly can be manufactured separately and assembled. According to another example, the assembly can include any suitable material encased in, coated with, or otherwise covered with a conductive material, such as a conductive metal or the like to provide a conductive metal surface. For example, the assembly can include a plastic core with a conductive surface coating thereon.

Overview

As noted above, antennas can be arrayed to provide wideband and ultra-wideband operation and higher gain. The bandwidth ratio is expressed as a function of the upper frequency band of the antenna divided by the lower frequency band of the antenna. Ultra-wideband operation is typically considered to include antenna arrays having a bandwidth ratio of 6:1 or greater, also referred to herein as a technology for transmitting information across a wide bandwidth. An example of such an antenna array includes a tightly coupled dipole array (TCDA), the aperture of which includes a cluster of closely spaced dipole elements extending from a ground plane. For instance, a digital phased array (DPA) aperture is a type of TCDA that provides UWB operation and a large field of view (FOV). Ultra-wideband operation is typically considered to include antenna arrays having a bandwidth ratio of 6:1 or greater, also referred to herein as a technology for transmitting information across a wide bandwidth.

Example TCDA

FIG. 1 is a schematic diagram of a TCDA 100, in accordance with an embodiment of the present disclosure. The TCDA 100 includes multiple half wave dipole antennas 102$a$, 102$b$, 102$c$, etc. Each dipole antenna 102$a$, 102$b$, 102$c$, can radiate or receive a signal 104 at a frequency of approximately $\lambda_1/2$, $\lambda_2/2$, and $\lambda_3/2$, respectively. An individual dipole antenna, such as dipole antenna 102*a*, radiates or receives a signal at a frequency $f_1$. The dipole antennas 102*a*, 102*b*, 102*c* can be located or arrayed adjacent to each other to radiate or receive signals at frequencies $f_2$, $f_3$, etc., such as shown in FIG. 1. Such an arrangement approximates a flat current distribution across all of the dipole antennas 102*a*, 102*b*, 102*c*.

Figure 2:
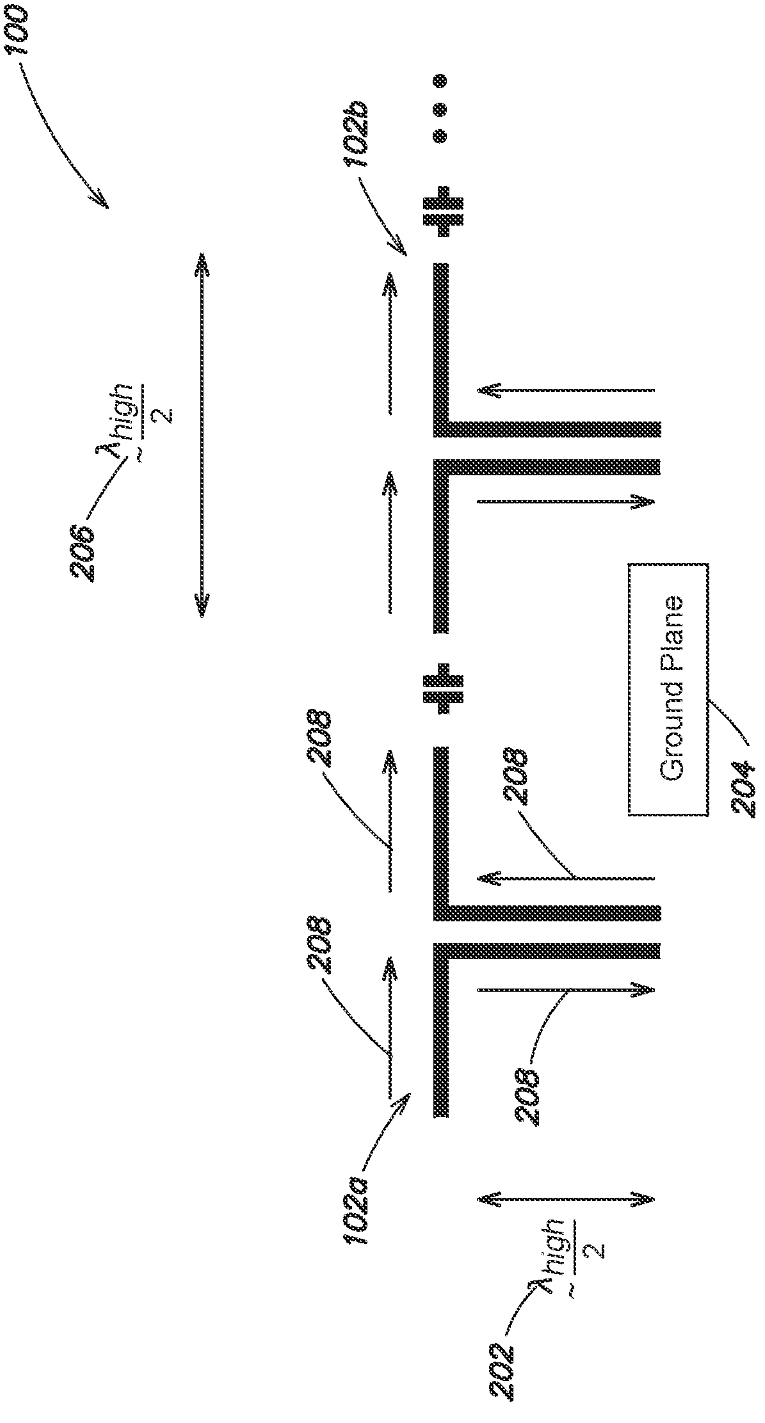
FIG. 2 is another schematic diagram of the TCDA of FIG. 1, in accordance with an example of the present disclosure.

FIG. 2 is another schematic diagram of the TCDA 100 of FIG. 1, in accordance with an example of the present disclosure. The upper cutoff frequency of the TCDA 100 is established by the height 202 of the dipole elements above a ground plane 204 and a pitch (width) 206 of each of the antennas 102*a*, 102*b*. The lower cutoff frequency can be extended by coupling each of the antennas 102*a*, 102*b* and through the use of lower dielectrics in the substrate.

Antennas can be balanced or unbalanced. Some existing TCDAs have wideband, single-ended (unbalanced) feeds. A single-ended feed antenna is considered unbalanced because the feed signal is not symmetrical about the point at which the feed meets the conductive element(s) of the antenna that radiate or absorb EM power. For example, in a dipole arrangement, one dipole arm is energized by the signal while the other dipole arm is shorted to a ground potential. By contrast, a balanced feed antenna has complementary signals 208 in the adjacent conductive elements, such as shown in FIG. 2.

However, balanced and unbalanced antennas can suffer from distortions caused by common mode noise, power supply noise, or electromagnetic interference, each of which affects antenna performance. For example, a signal radiating from one or more of the dipole antennas 102*a*, 102*b* can excite a common mode resonance upon the balanced feed of the adjacent dipole antenna(s) 102*a*, 102*b* when scanning in the ground plane 204 over a wide or ultra-wideband frequency range. The common mode resonance radiating from the antenna can interfere with and alter the phase of the signal on the feed line (also referred to as signal coupling), creating an unbalanced current that degrades the signal strength and reduces antenna efficiency. Thus, antenna performance depends on various interdependent design features.

For instance, TCDAs create a so-called current sheet array (CSA) having a low-profile (e.g., $\sim\lambda_{High}/2$) by using many dipole ports in concert to approximate a flat current distribution across the array. Some CSAs achieve 4:1 bandwidth ratio by introducing capacitive coupling between antenna elements to counter the effect of ground pane inductance. The bandwidth of CSAs can be increased by introducing wideband balanced feeds integrated on a printed circuit board (PCB). Such designs employ baluns, which are devices that interface between unbalanced and balanced signals and are optimized among the various dipole elements. However, baluns are intrinsically lossy and can adversely affect isolation performance over the bandwidth of the antenna. Furthermore, single-ended feeds are not well suited for the close integration needed for DPAs. For example, some integrated transceivers can be differential to accompany the balanced transmission lines on the RF side of integrated transceiver chips. A full differential radio can have common mode currents at the aperture and in between the ports that feed the aperture. As noted above, these common mode currents can greatly reduce the impedance bandwidth.

TCDAs provide certain benefits in certain applications. However, there is typically a trade-off in features between different TCDA designs. For example, TCDAs have interdependent features that must be tuned for application-specific requirements. Thus, while one particular TCDA design may be highly suited for one application—for example, an expanded or extended bandwidth of the aperture-such a design may reduce, for example, platform scalability or compatibility of the TCDA with other DPA chains. Likewise, another TCDA design may be scalable and readily compatible with other DPA chains but may suffer from narrower bandwidth at the aperture.

In some examples, TCDAs include dipole antennas, which are inherently differential antennas with opposing phase signals. Wide bandwidth TCDAs enable the antenna to perform several functions (e.g., transmit and receive several signals across a wide range of frequencies, e.g., >500 MHz) at a single aperture. To achieve these functions efficiently, the antenna should be designed to reduce losses incurred by common mode resonances when the antenna is driven at the power levels associated with those functions. As noted above, a balun can be used to mitigate common mode resonance (such as in a sheet array); however, a balun changes the signal from balanced to single-ended (e.g., non-linear) and thus affects the ability of the antenna to perform as efficiently across a wide bandwidth.

Thus, there is a need for a TCDA antenna that is easily scalable and has a wide or ultra-wide bandwidth without incurring increased losses. Examples of the present disclosure provide a TCDA that does not use a balun and/or a single-ended feed and permits differential (two balanced or complementary) signals to be fed into the antenna.

Example Modular Antenna Array

Figure 3:
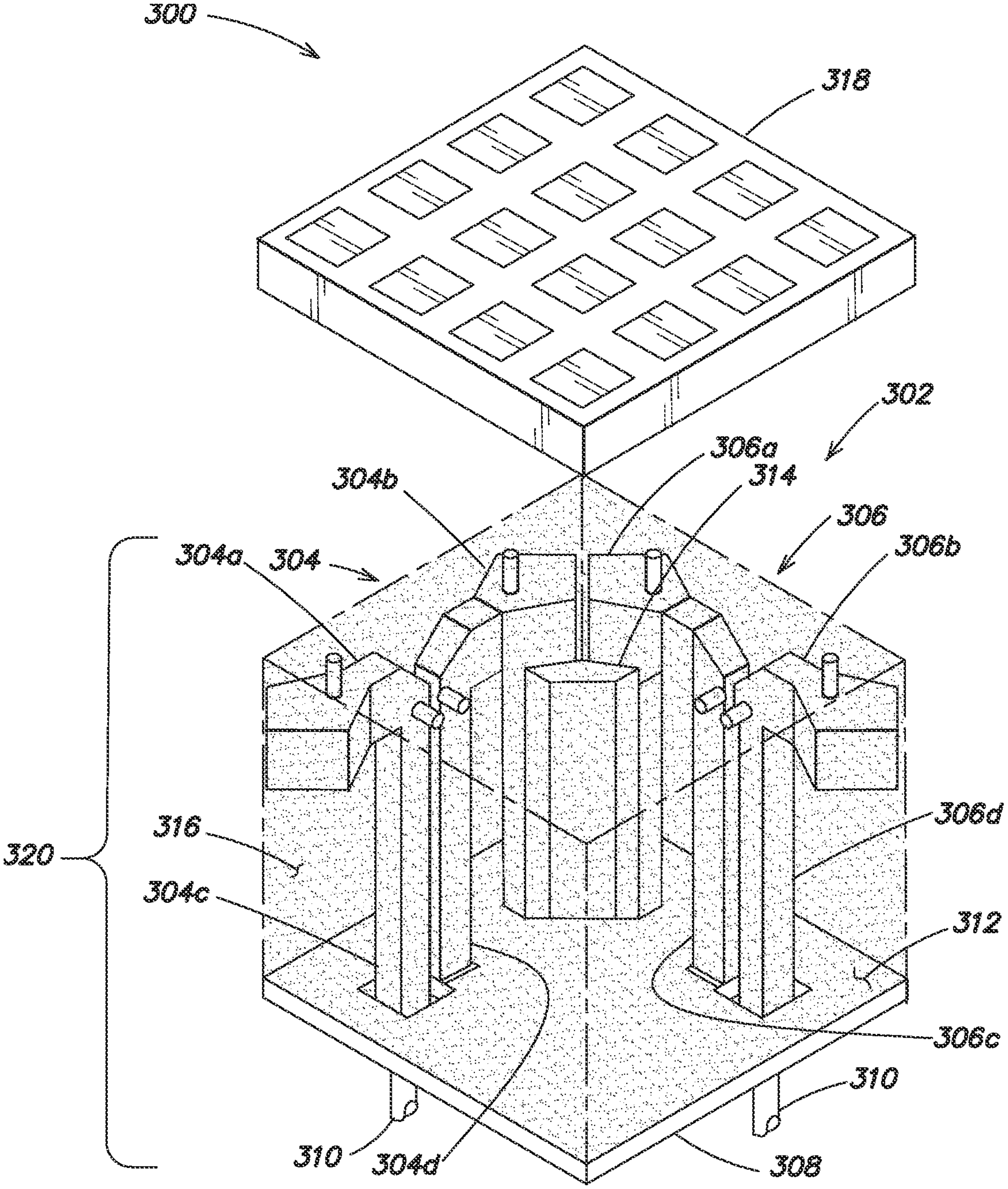
FIG. 3 is a top isometric perspective view of a modular antenna, according to an example of the present disclosure.

FIG. 3 is a top isometric perspective view of a modular antenna 300, according to an example of the present disclosure. The antenna 300 includes a 1×1 unit cell 302. The antenna 300 can, in some examples, include multiple unit cells arrayed together, such as 3×3, 6×6, etc., where each unit cell is similar to the 1×1 unit cell 302 shown in FIG. 3. In any event, the antenna 300 includes one or more 1×1 unit cells 302.

The unit cell 302 includes a first antenna element 304, a second antenna element 306, a ground plane 308, and at least one antenna feed 310. A surface of the first antenna element 304 and/or the second antenna element 306 includes at least a portion of an aperture of the modular antenna 300. The at least one antenna feed 310 is configured to receive a single-ended (unbalanced) signal or, in some embodiments, a balanced signal. Each antenna element 304, 306 includes a first conductive dipole arm 304*a*, 306*a* and a second conductive dipole arm 304*b*, 306*b*. The first conductive dipole arm 304*a*, 306*a* and the second conductive dipole arm 304*b*, 306*b* are each in planar alignment with a surface 312 of the ground plane 308. In some examples, the first conductive dipole arm 304*a*, 306*a* is a mirror image of the second conductive dipole arm 304*b*, 306*b* about a longitudinal axis extending perpendicular to the surface 312 of the ground plane 308, such that the first conductive dipole arm 304*a*, 306*a* is adjacent to the second conductive dipole arm 304*b*, 306*b*. Each antenna element 304, 306 further includes a first feedline 304*c*, 306*c* in electrical communication with the first conductive dipole arm 304*a*, 306*a* and the balanced antenna feed 310, and a second feedline 304*d*, 306*d* in electrical communication with the second conductive dipole arm 304*b*, 306*b*.

The unit cell 302 further includes a shorting post 314, which is shared between the first antenna element 304 and the second antenna element 306. By sharing the shorting post 314 between the first antenna element 304 and the second antenna element 306, the common mode resonance is pushed further out of the operational bandwidth than before possible with, for example, one or more non-shared shorting posts for each antenna element. The second dipole arm 304*b* of the first antenna element 304 and the first dipole arm 306*a* of the second antenna element 306 are each in electrical communication with the shorting post 314. The shorting post 314 shorts the second conductive dipole arm 304*b* of the first antenna element 304 and the first conductive dipole arm 306*a* of the second antenna element 306, respectively, to the ground plane 308. The shorting post 314 disrupts the common mode resonances (e.g., the coupled signal between adjacent unit cells 102) that would otherwise cause feed line radiation/coupling and reduce antenna efficiency. As a result, the shorting post 314 enables efficient radiation from the first and second conductive dipole arms 304*a*, 304*b*, 306*a*, 306*b* without added losses such that a bandwidth ratio of the antenna aperture can reach 10:1 (e.g., between approximately 2-20 GHz or 4-40 GHz) for balanced operation while using a single-ended feed and without a balun or other components for mitigating the common mode resonances.

In some examples, the unit cell 302 further includes at least one non-conductive structural support element 316 between the ground plane 308 and the first feedline 304*c*, 306*c*, the second feedline 304*d*, 306*d*, or both feedlines 304*c*, 306*c*, 304*d*, 306*d* of the first and second antenna elements 304, 306, respectively, and/or the shorting post 314. In some examples, the non-conductive structural support 316 includes a dielectric foam or resin surrounding the antenna elements 304 and 306 and/or the shorting post 314. The non-conductive structural support 316 provides mechanical stability for the first antenna element 304, the second antenna element 306, and/or the shorting post 314 and can also include sacrificial features that can be removed during fabrication of the unit cell 302, such as during an additive manufacturing process where components of the unit cell 302 (e.g., the ground plane 308, the feedlines 304*c*, 304*d*, 306*c*, 306*d*, and the dipole arms 304*a*, 304*b*, 306*a*, 306*b*) are fabricated by the successive addition of material (e.g., via a three-dimensional printing or other deposition process).

In some examples, the first conductive dipole arms 304*a*, 306*a* are linearly polarized with respect to a first plane of polarization (e.g., V-pol), and the second conductive dipole arms 304*b*, 306*b* are linearly polarized with respect to a second plane of polarization (e.g., H-pol), where the first plane of polarization is orthogonal to the second plane of polarization.

In operation, a signal, such as an analog RF signal, can propagate between the first conductive dipole arms 304*a*, 306*a* and the antenna feed 310 via the first feedline 304*c*, 306*c*. The signal can further propagate between the second conductive dipole arms 304*b*, 306*b* and the antenna feed 310 via the second feedline 304*d*, 306*d*. The antenna feed 310 can include a terminal coupled to the first feedline 304*c* and the second feedline 306*d* (e.g., the antenna feed 310 is coupled to one (single-ended) or both (balanced) of the feedlines 304*c* or 304*d* of the first antenna element 304, and to one or both of the feedlines 306*c* or 306*d* of the second antenna element 306).

In some examples, the unit cell 302, or an array of unit cells 302, is covered by a superstrate 318 or another overlay material. The superstrate 318 can include dielectric or other impedance matching materials to provide physical protection and temperature resilience for the modular antenna 300, and/or to increase power transfer and reduce signal reflection into and out of the modular antenna 300.

Modular Antenna Array Fabrication

FIGS. 4A-F are top isometric perspective views of various structures during several stages of fabrication of the modular antenna 300 of FIG. 3, in accordance with an example of the present disclosure. In general, the modular antenna 300, including one or more unit cells 302 or portions thereof, is printed or otherwise fabricated using additive manufacturing techniques. It will be understood that any number of the unit cells 302 can be fabricated in the disclosed manner, for example, as component arrays (i.e., a single unit cell 302), blocks of sub-arrays (i.e., multiple adjacent unit cells 302), or complete arrays of the unit cells 302.

The modular antenna 300 and certain other structural or sacrificial components are fabricated by additively depositing or printing material to form the various structures of the antenna, such that the product is formed from a single piece of continuous material, also referred to as an integral element 320. The integral element 320 includes, for example, the first antenna element 304, the second antenna element 306, and the shorting post 314. In some examples, the material is at least partially electrically conductive (e.g., it is all metal or at least partially metal). In some other examples, the material is at least partially non-conductive and at least partially plated with another conductive material (e.g., a metal plating).

In some examples, a low dielectric foam or resin 316 is added to voids around the additively fabricated material of the antenna components. The foam or resin 316 provides shock and vibration mitigation or other mechanical support of the antenna components, such as the first conductive dipole arm 304*a*, 306*a*, the second conductive dipole arm 304*b*, 306*b*, the first feedline 304*c*, 306*c*, and/or the second feedline 304*d*, 306*d*. In some examples, a perimeter caul plate 402 and a perforated top plate 404 can be placed around at least a portion of the modular antenna 300 to contain the foam or resin 316 during fabrication and prior to baking or setting the foam or resin into a semi-solid state.

Figure 4A:
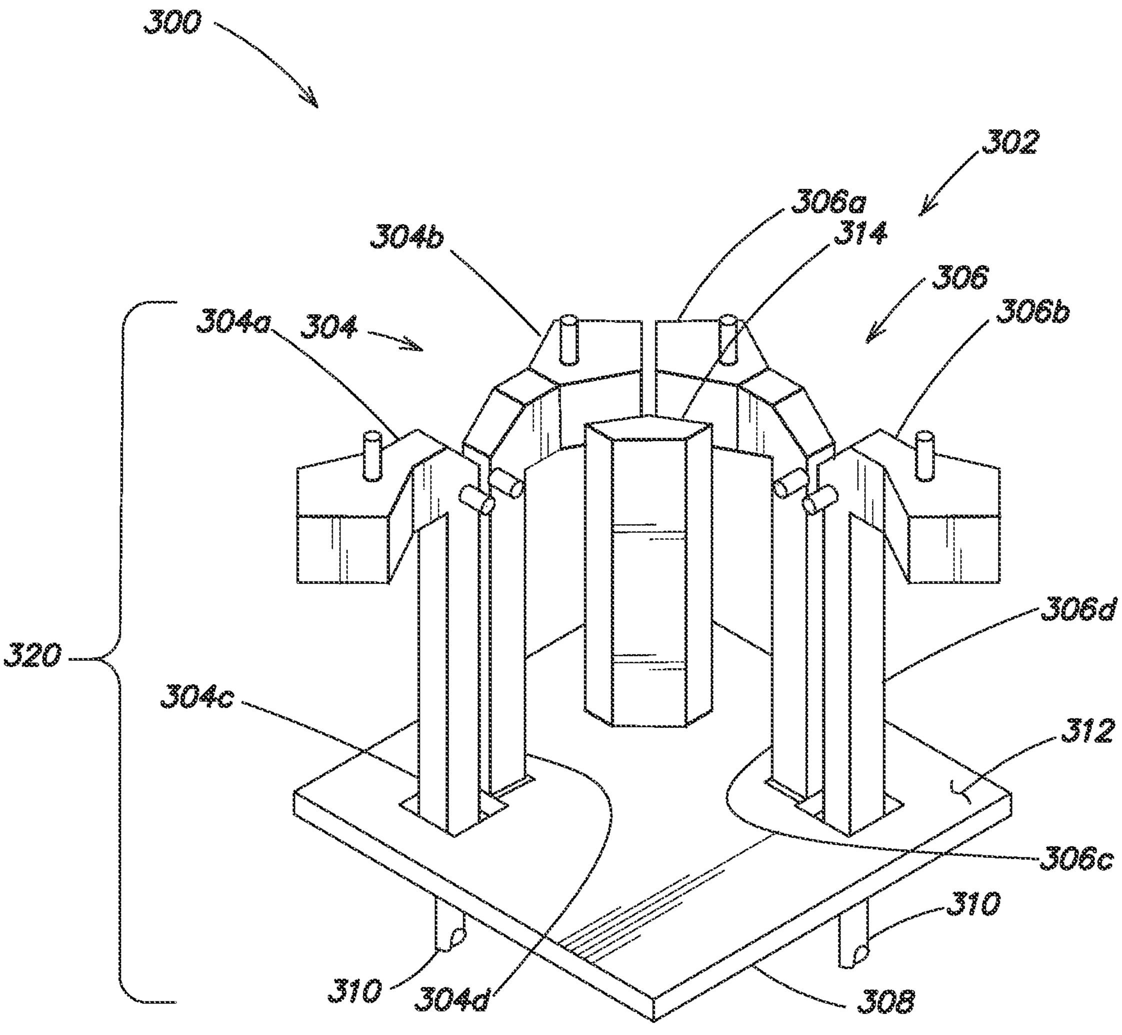
FIGS. 4A-F are top isometric perspective views of various structures during several stages of fabrication of the modular antenna of FIG. 3, in accordance with an example of the present disclosure.
Figure 4B:
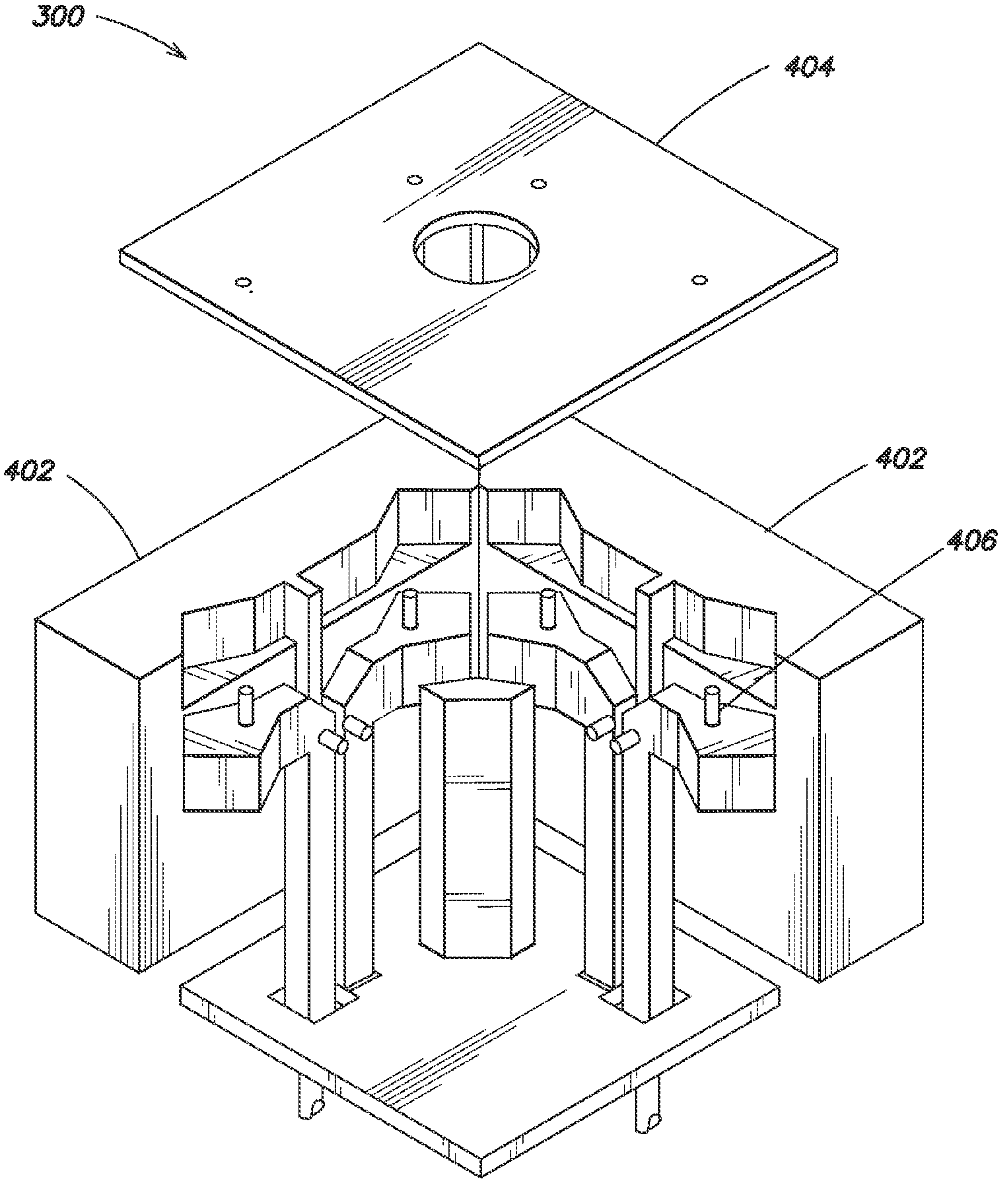
Figure 4C:
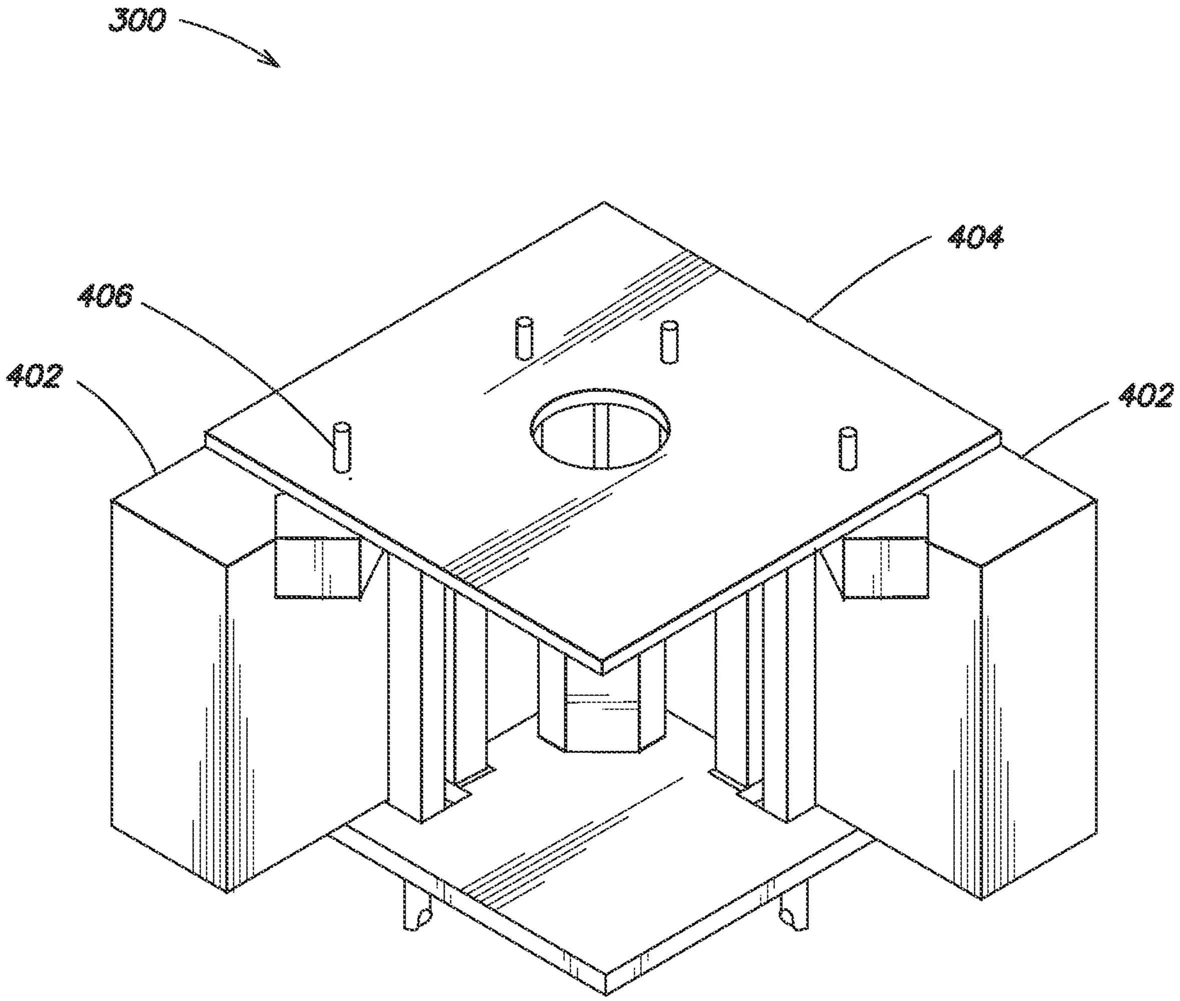
Figure 4D:
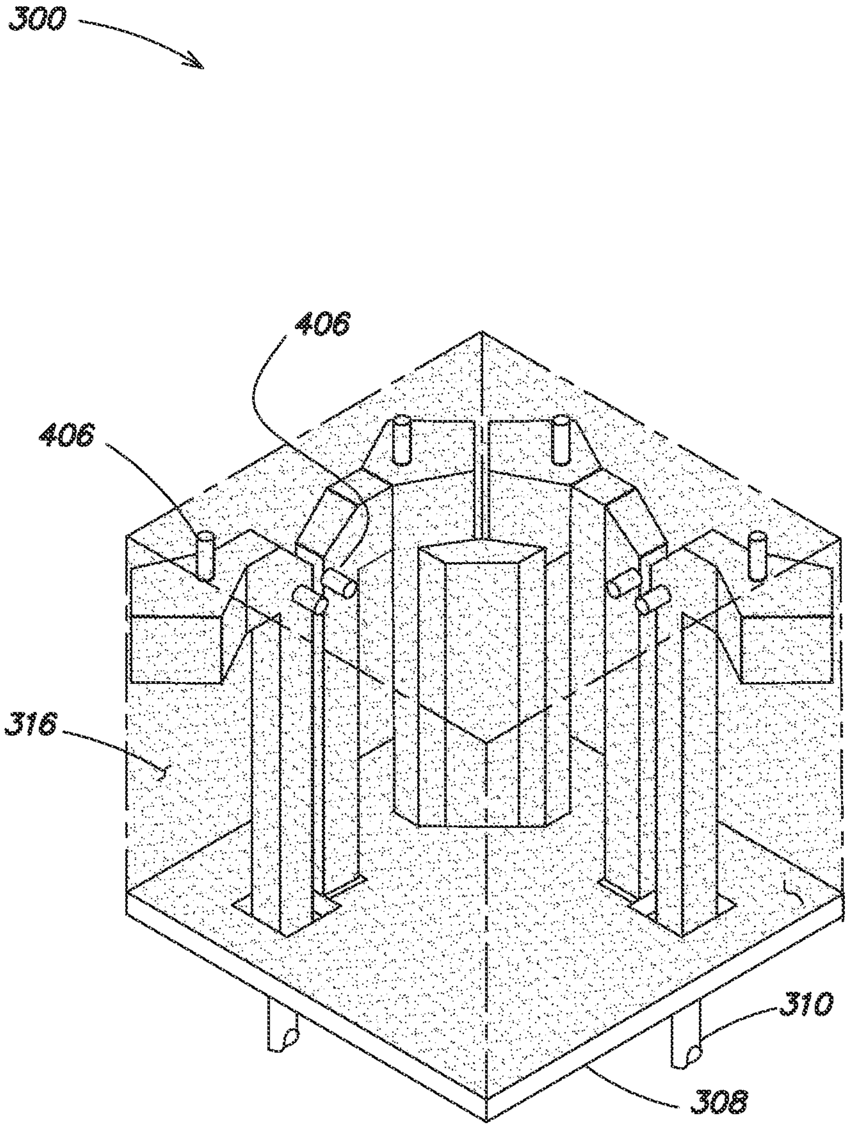
Figure 4E:
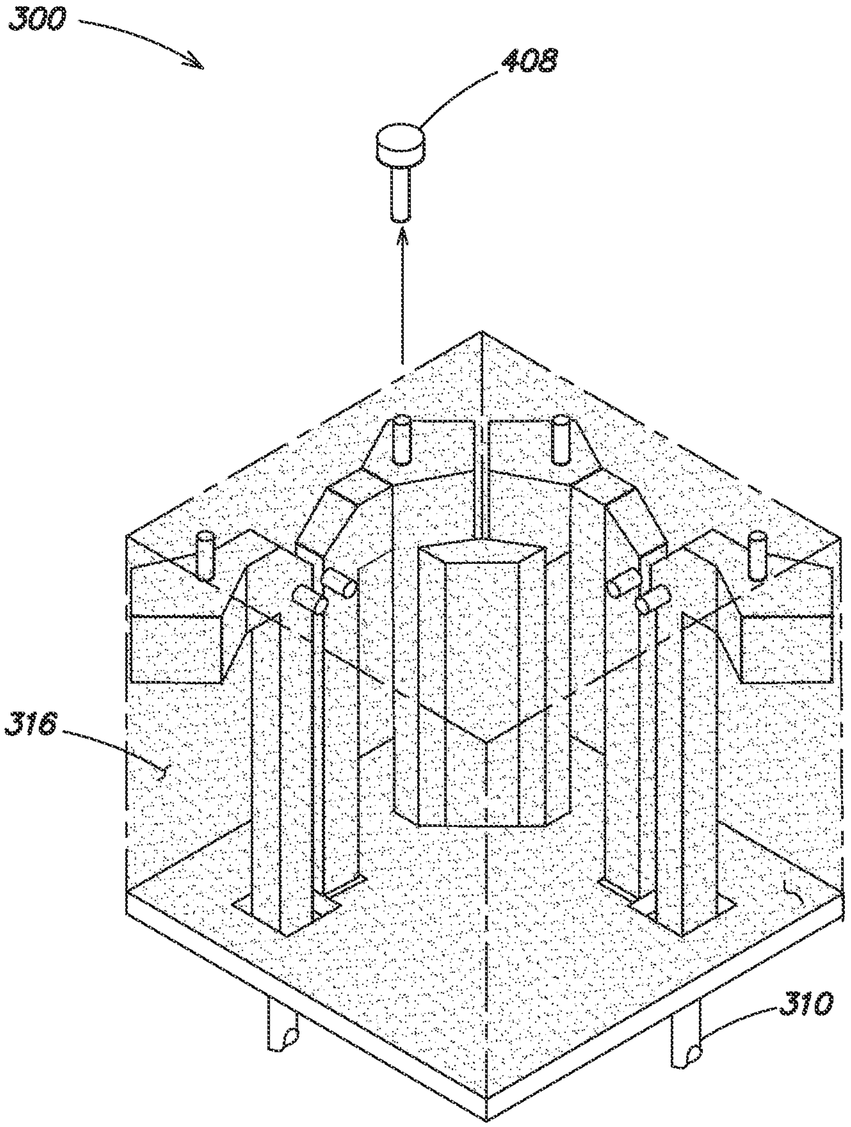
Figure 4F:
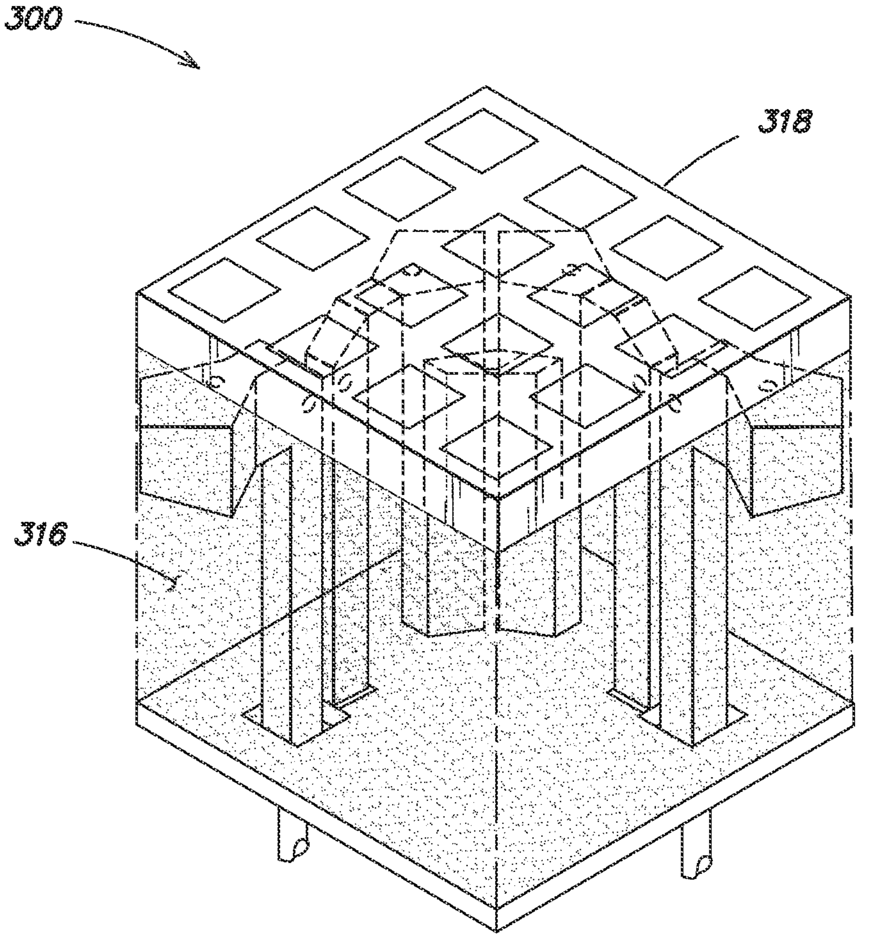

In some examples, such as shown in FIGS. 4A-D, one or more mechanical alignment structures 406 are fabricated in conjunction with one or more antenna components, including, for example, the first conductive dipole arm 304*a*, 306*a*, the second conductive dipole arm 304*b*, 306*b*, the first feedline 304*c*, 306*c*, and the second feedline 304*d*, 306*d*. The alignment structures 406 align the top plate 404 with the first conductive dipole arm 304*a*, 306*a*, the second conductive dipole arm 304*b*, 306*b*, prior to baking or otherwise setting the foam or resin 316. Once set, at least a portion of the foam or resin 316 provides structural support for the first conductive dipole arm 304*a*, 306*a*, the second conductive dipole arm 304*b*, 306*b*. Other portions of the foam or resin 316 and any mechanical alignment structures 406 not needed for structural support can then be machined or otherwise removed, such as shown at 408 in FIG. 4E. In some examples, a superstrate, such as the superstrate 318, or other overlay material can be attached to the modular antenna 300, such as shown in FIG. 4F.

Figure 4G:
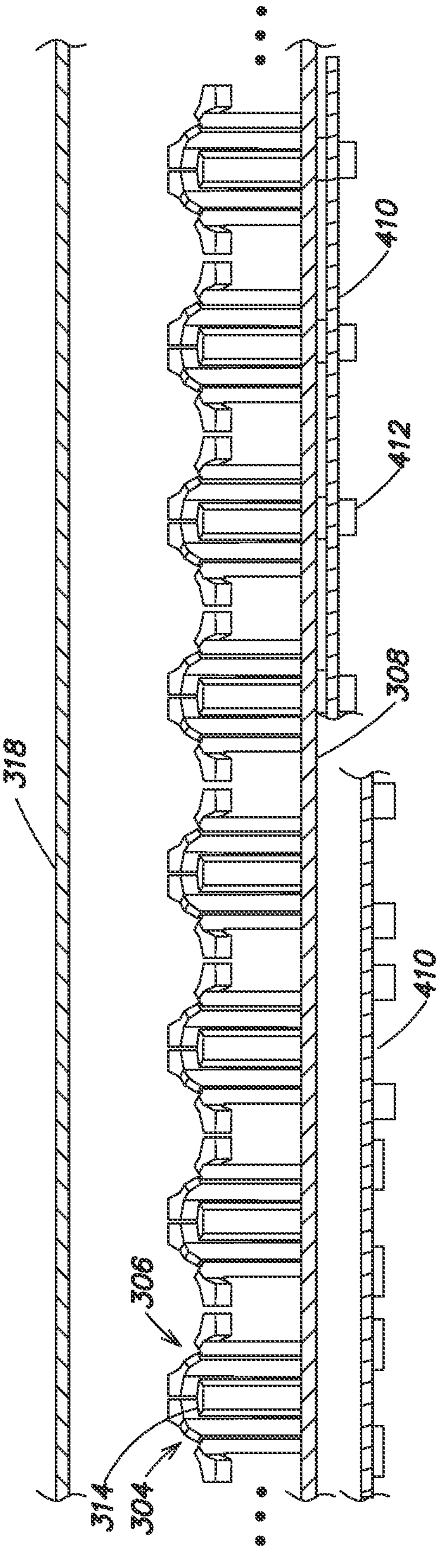
FIG. 4G is a cross-sectional plan view of the modular antenna of FIG. 3, in accordance with an example of the present disclosure.

FIG. 4G is a cross-sectional plan view of the modular antenna 300, in accordance with an example of the present disclosure. In some examples, a circuit board 410 can be attached at or to the ground plane 308, such as shown in FIG. 4G. The circuit board 410 can be configured to provide signal paths between the various components of the modular antenna array, such as the first feedline 304*c*, 306*c*, the second feedline 304*d*, 306*d*, and/or the shorting post 314 of each component antenna 300. The circuit board can include terminations or other connectors 412.

Further Example Examples

The following examples pertain to further examples, from which numerous permutations and configurations will be apparent.

Example 1 provides an antenna assembly including an antenna feed configured to receive a signal over a wide bandwidth; a ground plane; a first antenna element including a first conductive dipole arm in planar alignment with a surface of the ground plane and a second conductive dipole arm in planar alignment with the surface of the ground plane and adjacent to the first conductive dipole arm; a second antenna element including a third conductive dipole arm in planar alignment with the surface of the ground plane and adjacent to the second conductive dipole arm, and a fourth conductive dipole arm in planar alignment with the surface of the ground plane and adjacent to the third conductive dipole arm; and a shorting post in electrical communication with the ground plane, the second conductive dipole arm of the first antenna element and the third conductive dipole arm of the second antenna element.

Example 2 includes the subject matter of Example 1, further including a first feedline in electrical communication with the first conductive dipole arm of the first antenna element and the antenna feed; and a second feedline in electrical communication with the fourth conductive dipole arm of the second antenna element and the antenna feed.

Example 3 includes the subject matter of Example 2, further including a third feedline in electrical communication with the second conductive dipole arm of the first antenna element and one of the antenna feed and the ground plane; and a fourth feedline in electrical communication with the third conductive dipole arm of the second antenna element and one of the antenna feed and the ground plane.

Example 4 includes the subject matter of any one of Examples 1-3, further including at least one non-conductive structural support element between the ground plane and the first antenna element, the second antenna element, or both.

Example 5 includes the subject matter of Example 4, wherein the at least one non-conductive structural support includes a dielectric foam or resin.

Example 6 includes the subject matter of any one of Examples 1-5, wherein the third conductive dipole arm is perpendicular to the second conductive dipole arm.

Example 7 includes the subject matter of Example 6, wherein the first conductive dipole arm is parallel to the second conductive dipole arm, and wherein the fourth conductive dipole arm is parallel to the third conductive dipole arm.

Example 8 includes the subject matter of Example 7, wherein the first and second conductive dipole arms are linearly polarized with respect to a first plane of polarization, wherein the third and fourth conductive dipole arms are linearly polarized with respect to a second plane of polarization, and wherein the first plane of polarization is orthogonal to the second plane of polarization.

Example 9 includes the subject matter of any one of Examples 1-8, further comprising an integral element additively manufactured into a single continuous piece of material, the integral element including the ground plane, the first antenna element, the second antenna element, and the shorting post.

Example 10 includes the subject matter of Example 9, wherein the integral element includes an electrically conductive material.

Example 11 includes the subject matter of Example 9, wherein the integral element includes a non-conductive material plated with an electrically conductive material.

Example 12 includes the subject matter of any one of Examples 1-11, further including an aperture configured to provide up to a 10:1 bandwidth ratio.

Example 13 provides an antenna assembly method including additively manufacturing an integral element as a single continuous piece of material, the integral element including an antenna feed configured to receive a signal over a wide bandwidth; a ground plane; a first antenna element including a first conductive dipole arm in planar alignment with a surface of the ground plane and a second conductive dipole arm in planar alignment with the surface of the ground plane and adjacent to the first conductive dipole arm; a second antenna element including a third conductive dipole arm in planar alignment with the surface of the ground plane and adjacent to the second conductive dipole arm, and a fourth conductive dipole arm in planar alignment with the surface of the ground plane and adjacent to the third conductive dipole arm; and a shorting post in electrical communication with the ground plane, the second conductive dipole arm of the first antenna element and the third conductive dipole arm of the second antenna element; and attaching a superstrate to the integral element.

Example 14 includes the subject matter of Example 13, wherein the integral element further includes a first feedline in electrical communication with the first conductive dipole arm of the first antenna element and the antenna feed; and a second feedline in electrical communication with the fourth conductive dipole arm of the second antenna element and the antenna feed.

Example 15 includes the subject matter of Example 14, wherein the integral element further includes a third feedline in electrical communication with the second conductive dipole arm of the first antenna element and one of the antenna feed and the ground plane; and a fourth feedline in electrical communication with the third conductive dipole arm of the second antenna element and one of the antenna feed and the ground plane.

Example 16 includes the subject matter of any one of Examples 13-15, further including attaching at least one non-conductive structural support element between the ground plane and the first antenna element, the second antenna element, or both.

Example 17 includes the subject matter of Example 16, wherein the at least one non-conductive structural support includes a dielectric foam or resin.

Example 18 includes the subject matter of any one of Examples 13-17, wherein the integral element includes an electrically conductive material.

Example 19 includes the subject matter of any one of Examples 13-17, wherein the integral element includes a non-conductive material plated with an electrically conductive material.

Example 20 includes the subject matter of any one of Examples 13-19, further including attaching an aperture configured to provide up to a 6:1 bandwidth ratio.

Numerous specific details have been set forth herein to provide a thorough understanding of the examples. It will be understood, however, that other examples may be practiced without these specific details, or otherwise with a different set of details. It will be further appreciated that the specific structural and functional details disclosed herein are representative of examples and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims. Furthermore, examples described herein may include other elements and components not specifically described, such as electrical connections, signal transmitters and receivers, processors, or other suitable components for operation of the modular antenna.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and examples have been described herein. The features, aspects, and examples are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An antenna assembly comprising:

an antenna feed configured to receive a signal over a wide bandwidth;

a ground plane;

a first antenna element including a first conductive dipole arm in planar alignment with a surface of the ground plane and a second conductive dipole arm in planar alignment with the surface of the ground plane and adjacent to the first conductive dipole arm;

a second antenna element including a third conductive dipole arm in planar alignment with the surface of the ground plane and adjacent to the second conductive dipole arm, and a fourth conductive dipole arm in planar alignment with the surface of the ground plane and adjacent to the third conductive dipole arm; and a shorting post in electrical communication with the ground plane, said shorting post further being in electrical communication, by way of only the ground plane, with the second conductive dipole arm of the first antenna element and the third conductive dipole arm of the second antenna element, wherein the shorting post is adjacent to the second conductive dipole arm of the first antenna element and the third conductive dipole arm of the second antenna element;

wherein the first conductive dipole arm, second conductive dipole arm, third conductive dipole arm, and fourth conductive dipole arm extend perpendicularly from the surface of the ground plane.

2. The antenna assembly of claim 1, further comprising:

a first feedline in electrical communication with the first conductive dipole arm of the first antenna element and the antenna feed; and a second feedline in electrical communication with the fourth conductive dipole arm of the second antenna element and the antenna feed.

3. The antenna assembly of claim 2, further comprising:

a third feedline in electrical communication with the second conductive dipole arm of the first antenna element and one of the antenna feed and the ground plane; and a fourth feedline in electrical communication with the third conductive dipole arm of the second antenna element and one of the antenna feed and the ground plane.

4. The antenna assembly of claim 1, further comprising at least one non-conductive structural support element between the ground plane and the first antenna element, the second antenna element, or both.

5. The antenna assembly of claim 4, wherein the at least one non-conductive structural support includes a dielectric foam or resin.

6. The antenna assembly of claim 1, wherein the third conductive dipole arm is perpendicular to the second conductive dipole arm.

7. The antenna assembly of claim 6, wherein the first conductive dipole arm is parallel to the second conductive dipole arm, and wherein the fourth conductive dipole arm is parallel to the third conductive dipole arm.

8. The antenna assembly of claim 7, wherein the first and second conductive dipole arms are linearly polarized with respect to a first plane of polarization, wherein the third and fourth conductive dipole arms are linearly polarized with respect to a second plane of polarization, and wherein the first plane of polarization is orthogonal to the second plane of polarization.

9. The antenna assembly of claim 1, further comprising an integral element additively manufactured into a single continuous piece of material, the integral element including the ground plane, the first antenna element, the second antenna element, and the shorting post.

10. The antenna assembly of claim 9, wherein the integral element includes an electrically conductive material.

11. The antenna assembly of claim 9, wherein the integral element includes a non-conductive material plated with an electrically conductive material.

12. The antenna assembly of claim 1, further comprising an aperture configured to provide up to a 10:1 bandwidth ratio.

13. An antenna assembly method comprising:

additively manufacturing an integral element as a single continuous piece of material, the integral element including:

an antenna feed configured to receive a signal over a wide bandwidth;

a ground plane;

a first antenna element including a first conductive dipole arm in planar alignment with a surface of the ground plane and a second conductive dipole arm in planar alignment with the surface of the ground plane and adjacent to the first conductive dipole arm;

a second antenna element including a third conductive dipole arm in planar alignment with the surface of the ground plane and adjacent to the second conductive dipole arm, and a fourth conductive dipole arm in planar alignment with the surface of the ground plane and adjacent to the third conductive dipole arm; and a shorting post in electrical communication with the ground plane, said shorting post further being in electrical communication, by way of only the ground plane, with the second conductive dipole arm of the first antenna element and the third conductive dipole arm of the second antenna element, wherein the shorting post is adjacent to the second conductive dipole arm of the first antenna element and the third conductive dipole arm of the second antenna element; and attaching a superstrate to the integral element;

wherein the first conductive dipole arm, second conductive dipole arm, third conductive dipole arm, and fourth conductive dipole arm extend perpendicularly from the surface of the ground plane.

14. The antenna assembly method of claim 13, wherein the integral element further comprises:

a first feedline in electrical communication with the first conductive dipole arm of the first antenna element and the antenna feed; and a second feedline in electrical communication with the fourth conductive dipole arm of the second antenna element and the antenna feed.

15. The antenna assembly method of claim 14, wherein the integral element further comprises:

a third feedline in electrical communication with the second conductive dipole arm of the first antenna element and one of the antenna feed and the ground plane; and a fourth feedline in electrical communication with the third conductive dipole arm of the second antenna element and one of the antenna feed and the ground plane.

16. The antenna assembly method of claim 13, further comprising attaching at least one non-conductive structural support element between the ground plane and the first antenna element, the second antenna element, or both.

17. The antenna assembly method of claim 16, wherein the at least one non-conductive structural support includes a dielectric foam or resin.

18. The antenna assembly method of claim 13, wherein the integral element includes an electrically conductive material.

19. The antenna assembly method of claim 13, wherein the integral element includes a non-conductive material plated with an electrically conductive material.

20. The antenna assembly method of claim 13, further comprising attaching an aperture configured to provide up to a 10:1 bandwidth ratio.

* * * * *